(12) United States Patent
Cammenga et al.

(10) Patent No.: US 11,307,485 B2
(45) Date of Patent: Apr. 19, 2022

(54) SWITCHABLE IMAGER LENS COVER

(71) Applicant: Gentex Corporation, Zeeland, MI (US)

(72) Inventors: David J. Cammenga, Zeeland, MI (US); Xiaoxu Niu, Holland, MI (US); Kurtis L. Geerlings, Zeeland, MI (US); Jason D. Hallack, Allendale, MI (US); Robert R. Turnbull, Holland, MI (US); Carl N. Wassink, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 346 days.

(21) Appl. No.: 16/407,818

(22) Filed: May 9, 2019

(65) Prior Publication Data

US 2019/0346742 A1    Nov. 14, 2019

Related U.S. Application Data

(60) Provisional application No. 62/668,962, filed on May 9, 2018, provisional application No. 62/685,426, filed on Jun. 15, 2018.

(51) Int. Cl.
| | | |
|---|---|---|
| *G03B 11/04* | (2021.01) | |
| *H04N 5/225* | (2006.01) | |
| *H04N 5/232* | (2006.01) | |
| *B60R 11/04* | (2006.01) | |
| *G02F 1/1335* | (2006.01) | |
| *G02B 5/23* | (2006.01) | |

(Continued)

(52) U.S. Cl.
CPC ............ *G03B 11/043* (2013.01); *B60R 11/04* (2013.01); *G02B 5/23* (2013.01); *G02F 1/133526* (2013.01); *G02F 1/133528* (2013.01); *H04N 5/22541* (2018.08); *H04N 5/232* (2013.01); *B60R 2011/004* (2013.01); *B60R 2300/10* (2013.01); *G02B 27/0006* (2013.01)

(58) Field of Classification Search
CPC ......... G02B 5/23; G02B 11/043; B60R 11/04; B60R 2011/004; B60R 2300/10
See application file for complete search history.

(56) References Cited

U.S. PATENT DOCUMENTS

| | | |
|---|---|---|
| 3,659,307 A | 5/1972 | Vitou |
| 4,063,258 A | 12/1977 | Allen |
| 4,410,563 A | 10/1983 | Richter et al. |

(Continued)

FOREIGN PATENT DOCUMENTS

| | | |
|---|---|---|
| EP | 1006486 A2 | 6/2000 |
| EP | 1227683 A1 | 7/2002 |

(Continued)

*Primary Examiner* — Christopher Stanford
*Assistant Examiner* — Journey F Sumlar
(74) *Attorney, Agent, or Firm* — Price Heneveld LLP; Brian James Brewer

(57) ABSTRACT

An imager module for a vehicle includes an imager having an imager lens. The imager is configured to collect image data from at least one of inside and outside the vehicle. A cover is disposed proximate the imager lens and configured to allow the imager to capture image data through the cover. The cover is operable between a first condition, wherein the imager is generally visible through the cover, and a second condition, wherein the imager is generally concealed from view by the cover.

18 Claims, 12 Drawing Sheets

(51) Int. Cl.
*B60R 11/00* (2006.01)
*G02B 27/00* (2006.01)

(56) References Cited

U.S. PATENT DOCUMENTS

| | | | |
|---|---|---|---|
| 4,621,785 A | 11/1986 | Embra | |
| 4,699,478 A | 10/1987 | Tsui et al. | |
| 4,736,218 A | 4/1988 | Kutman | |
| 5,068,770 A | 11/1991 | Baziuk | |
| 5,121,200 A | 6/1992 | Choi | |
| 5,140,455 A | 8/1992 | Varaprasad et al. | |
| 5,315,333 A | 5/1994 | Nash | |
| 5,418,567 A | 5/1995 | Boers et al. | |
| 5,619,036 A | 4/1997 | Salvio et al. | |
| 5,760,828 A | 6/1998 | Cortes | |
| 5,761,556 A | 6/1998 | Ichino | |
| 5,833,101 A | 11/1998 | Watkins | |
| 5,910,854 A | 6/1999 | Varaprasad et al. | |
| 6,138,319 A | 10/2000 | Benoit | |
| 6,333,759 B1 | 12/2001 | Mazzilli | |
| 6,536,961 B1 | 3/2003 | Gillies | |
| 6,580,373 B1 | 6/2003 | Ohashi | |
| 6,607,606 B2 | 8/2003 | Bronson | |
| 6,619,806 B2 | 9/2003 | Akami et al. | |
| 6,731,867 B1 | 5/2004 | Sherwin | |
| 6,911,997 B1 | 6/2005 | Okamoto et al. | |
| 7,104,657 B2 | 9/2006 | Sherwin | |
| 7,111,996 B2 | 9/2006 | Seger et al. | |
| 7,245,207 B1 | 7/2007 | Dayan et al. | |
| 7,255,451 B2 | 8/2007 | McCabe et al. | |
| 7,265,656 B2 | 9/2007 | McMahon et al. | |
| 7,310,177 B2 | 12/2007 | McCabe et al. | |
| 7,355,629 B2 | 4/2008 | Lang et al. | |
| 7,387,454 B2 | 6/2008 | Kikuchi et al. | |
| 7,448,812 B2 | 11/2008 | Heibel | |
| 7,499,100 B2 | 3/2009 | Miyazaki et al. | |
| 7,579,939 B2 | 8/2009 | Schofield et al. | |
| 7,609,961 B2 | 10/2009 | Park | |
| 7,630,624 B2 | 12/2009 | Chang | |
| 7,813,639 B2 | 10/2010 | Yoneji | |
| 7,881,496 B2 | 2/2011 | Camilleri et al. | |
| 7,883,064 B2 | 2/2011 | Luft et al. | |
| 7,891,886 B2 | 2/2011 | Schuetz | |
| 7,965,336 B2 | 6/2011 | Bingle et al. | |
| 8,031,224 B2 | 10/2011 | Linsenmaier et al. | |
| 8,077,406 B2 | 12/2011 | Hachitani et al. | |
| 8,118,501 B2 | 2/2012 | Buschmann | |
| 9,229,104 B2 | 1/2016 | Klar et al. | |
| 9,838,653 B2 | 12/2017 | Fish, Jr. et al. | |
| 9,849,836 B2 | 12/2017 | Minikey, Jr. et al. | |
| 10,048,696 B2 * | 8/2018 | Meyhofer | H04N 5/2258 |
| 2005/0275738 A1 | 12/2005 | Arai | |
| 2006/0171704 A1 | 8/2006 | Bingle et al. | |
| 2006/0238318 A1 | 10/2006 | Brouwer et al. | |
| 2006/0256459 A1 | 11/2006 | Izabel et al. | |
| 2007/0132610 A1 | 6/2007 | Guemalec et al. | |
| 2007/0182817 A1 | 8/2007 | Briggance | |
| 2007/0223899 A1 | 9/2007 | Snow | |
| 2007/0236569 A1 | 10/2007 | Lin | |
| 2008/0007645 A1 * | 1/2008 | McCutchen | H04N 5/238 348/360 |
| 2008/0212189 A1 | 9/2008 | Baur et al. | |
| 2008/0304819 A1 | 12/2008 | Tolbert | |
| 2009/0122141 A1 | 5/2009 | Nakamura et al. | |
| 2009/0250533 A1 | 10/2009 | Akiyama et al. | |
| 2010/0118145 A1 | 5/2010 | Betham et al. | |
| 2010/0277379 A1 | 11/2010 | Lindackers et al. | |
| 2011/0033663 A1 | 2/2011 | Svec et al. | |
| 2011/0037863 A1 | 2/2011 | Mihota et al. | |
| 2011/0141281 A1 | 6/2011 | Barefoot et al. | |
| 2011/0317298 A1 | 12/2011 | Van Stiphout | |
| 2012/0327234 A1 | 12/2012 | Fish, Jr. et al. | |
| 2014/0111684 A1 | 4/2014 | Corbin et al. | |
| 2014/0253731 A1 | 9/2014 | Suman et al. | |
| 2016/0100084 A1 | 4/2016 | Schofield et al. | |
| 2016/0191863 A1 | 6/2016 | Minikey, Jr. et al. | |
| 2017/0123575 A1 | 5/2017 | Evans, V et al. | |
| 2018/0091779 A1 | 3/2018 | Hendricks | |
| 2018/0244204 A1 * | 8/2018 | Boehm | H04N 5/2253 |
| 2018/0284573 A1 * | 10/2018 | Cammenga | G02F 1/137 |
| 2019/0324343 A1 * | 10/2019 | Atkinson | G09G 3/20 |
| 2019/0346741 A1 | 11/2019 | Cammenga et al. | |

FOREIGN PATENT DOCUMENTS

| | | |
|---|---|---|
| EP | 1529688 B1 | 2/2007 |
| KR | 20080042418 A | 5/2008 |
| KR | 100909368 B1 | 7/2009 |
| KR | 101134305 B1 | 4/2012 |
| KR | 101343814 B1 | 12/2013 |
| KR | 20160133076 A | 11/2016 |
| WO | 2017201374 A1 | 11/2017 |

* cited by examiner

SWITCHABLE IMAGER LENS COVER

CROSS-REFERENCE TO RELATED APPLICATIONS

This application claims priority to and the benefit under 35 U.S.C. § 119(e) of U.S. Provisional Patent Application No. 62/668,962, filed on May 9, 2018, entitled "SWITCHABLE IMAGER LENS COVER," by David J. Cammenga et al., and U.S. Provisional Patent Application No. 62/685,426, filed on Jun. 15, 2018, entitled "SWITCHABLE IMAGER LENS COVER," by David J. Cammenga et al., the entire disclosures of which are incorporated herein by reference.

TECHNOLOGICAL FIELD

The present invention generally relates to an imager lens cover, and more particularly, to a switchable imager lens cover.

SUMMARY OF THE DISCLOSURE

In one aspect of the present disclosure, an imager module for a vehicle includes an imager having an imager lens. The imager is configured to collect image data from at least one of inside and outside the vehicle. A cover is disposed proximate the imager lens and configured to allow the imager to capture image data through the cover. The cover includes an electro-optic element that is operable between a first condition, wherein the imager is generally visible through the cover, and a second condition, wherein the imager is generally concealed from view by the cover. The imager module further includes a light sensor subsystem for sensing an ambient light level, and a controller configured to receive an output from the light sensor subsystem representing the ambient light level and to control the electro-optic element by selecting a clear state when the ambient light level is below a first threshold level and by selecting a dimmed state when the ambient light level is above a second threshold level.

In another aspect of the present disclosure, an imager lens cover for a vehicle includes a cover disposed proximate an imager lens. The cover is configured to allow an imager to capture image data through the cover. The cover includes at least one of a liquid crystal device, suspended particle device, variable light attenuation device, and light scattering device. The cover is operable between a first condition, wherein the imager is generally visible through the cover, and a second condition, wherein the imager is generally concealed from view by the cover.

In yet another aspect of the present disclosure, an imager lens cover for a vehicle includes a cover disposed proximate an imager lens. The cover is configured to allow an imager to capture image data through the cover. The cover is operable between a first condition, wherein the imager is generally visible through the cover, and a second condition, wherein the imager is generally concealed from view by the cover.

In still another aspect of the present disclosure, an imager module for a vehicle includes an imager having an imager lens. The imager is configured to collect image data from at least one of inside and outside the vehicle. A cover is disposed proximate the imager lens. The cover is configured to conceal the imager and includes a variable light attenuation device and a concealment device. The cover is operable between a first condition, wherein the imager is generally visible through the cover, and a second condition, wherein the imager is generally concealed from view through the cover.

In still yet another aspect of the present disclosure, an imager lens cover for a vehicle includes a cover disposed proximate an imager lens. The cover is configured to allow an imager to capture image data through the cover. The cover includes a light scattering device operable between a first condition, wherein the imager is generally visible through the cover, and a second condition, wherein the imager is generally concealed from view through the cover.

These and other features, advantages, and objects of the present invention will be further understood and appreciated by those skilled in the art by reference to the following specification, claims, and appended drawings.

DETAILED DESCRIPTION

Figure 1:
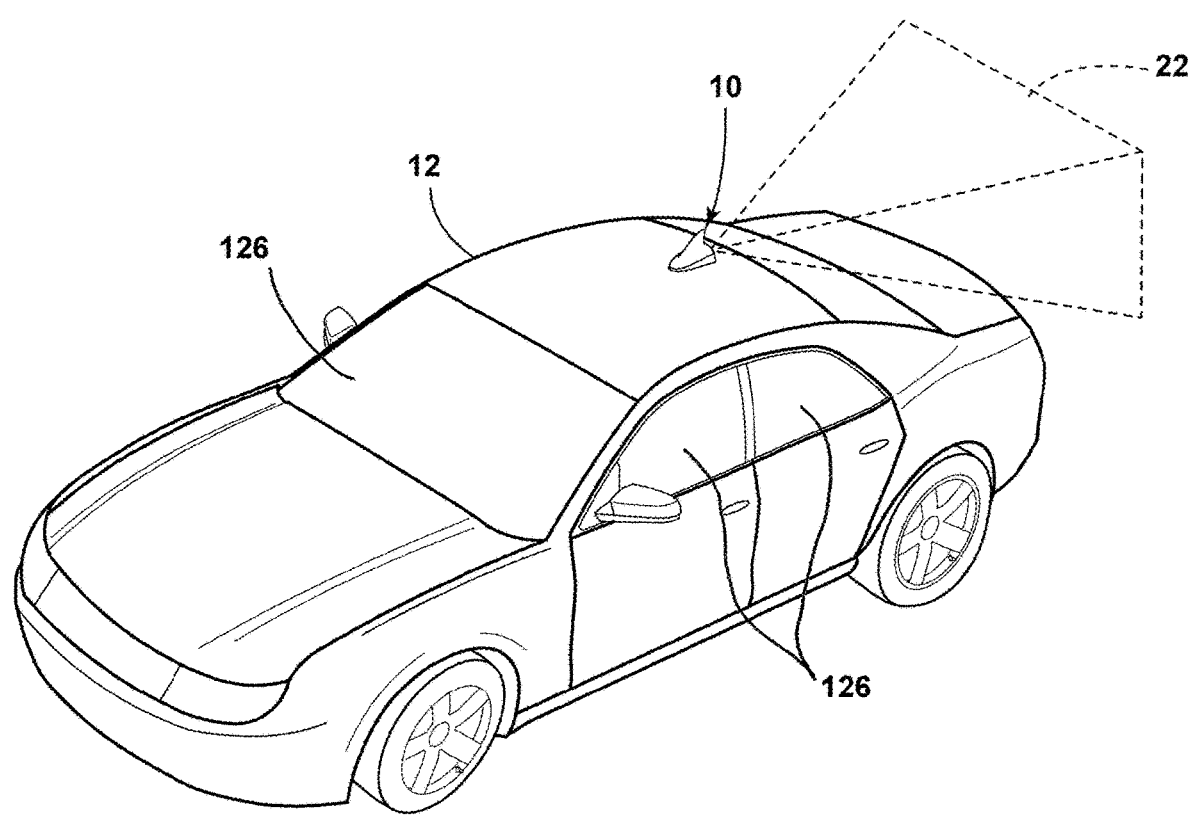
FIG. 1 is a top perspective view of one embodiment of a roof-mounted antenna and imager module installed on a roof of a vehicle.
Figure 1A:
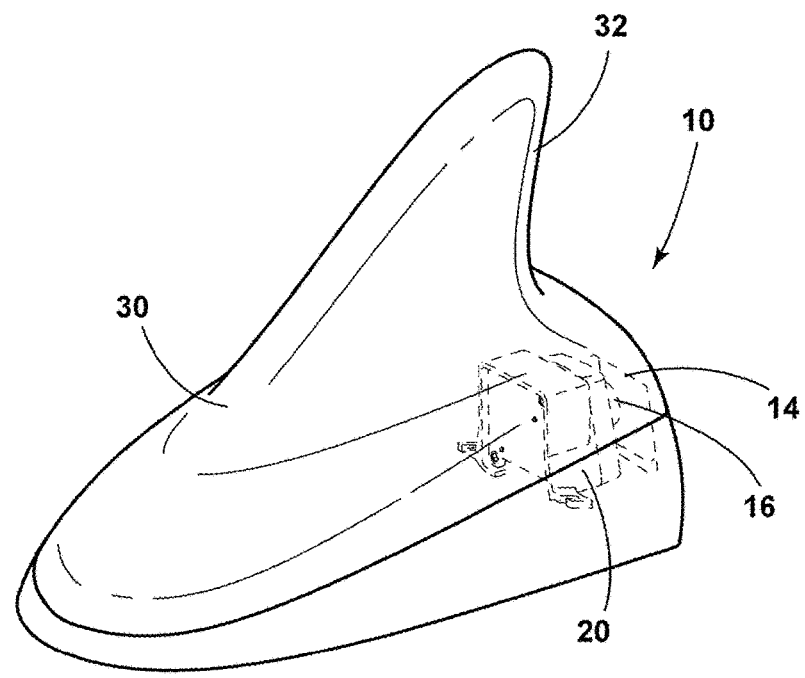
FIG. 1A is a front top perspective view of the roof-mounted antenna and imager module of FIG. 1.

The present illustrated embodiments reside primarily in combinations of method steps and apparatus components related to a switchable imager lens cover. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-10, the reference numeral 10 generally designates an imager lens cover for a vehicle 12 that includes a cover 14 disposed proximate an imager lens 16. The cover 14 is configured to allow an imager 20 to capture image data 22 through the cover 14. The cover 14 is operable between a first condition (FIG. 3A), wherein the imager 20 is generally visible through the cover 14, and a second condition (FIG. 3B), wherein the imager 20 is generally concealed from view by the cover 14.

The use of imagers (including cameras, sensors, etc.) on vehicles is becoming more widespread in an effort to increase safety and provide additional functionality on vehicles. Oftentimes these imagers are not aesthetically pleasing to the consumer. Accordingly, ways to conceal the imagers, yet enable a full range of use for the imagers, is valuable. Vehicle manufacturers are utilizing more imagers than ever before in an effort to move the industry toward semiautonomous and fully autonomous vehicles. However, the appearance of the imagers, as noted above, can be unsightly. The concepts set forth herein address concealability issues.

In an effort to conceal imagers from view, mechanical systems are frequently used. However, mechanical systems frequently require moving parts, which, over time, results in wear and tear on static and moving parts of the system, resulting in failure of the mechanical system. An alternative is to utilize an electro-optic device in the cover 14 that extends over the imager lens 16.

Figure 2:
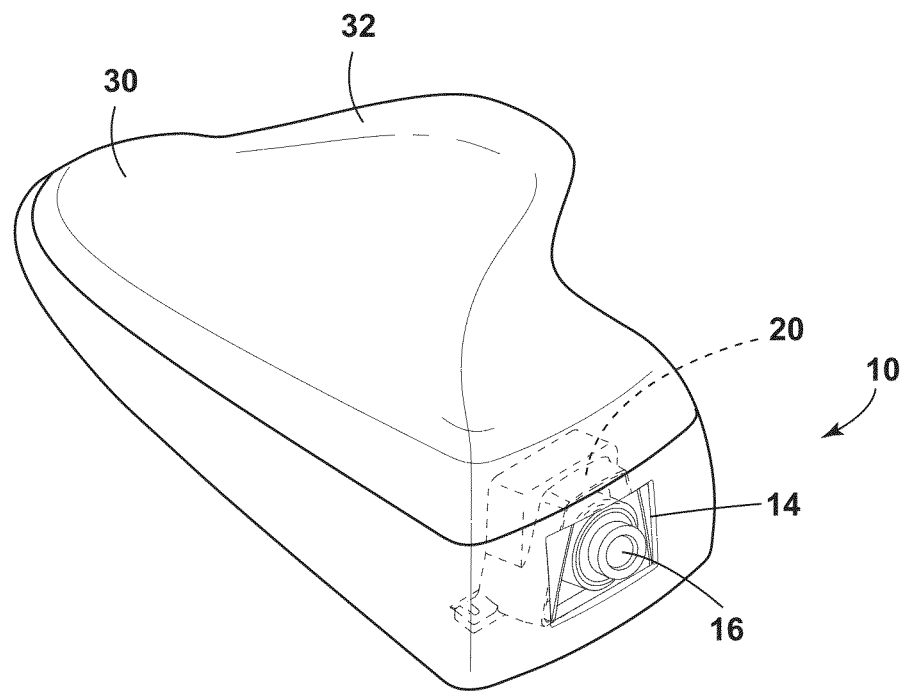
FIG. 2 is a rear top perspective view of the roof-mounted antenna and imager module of FIG. 1.
Figure 3:
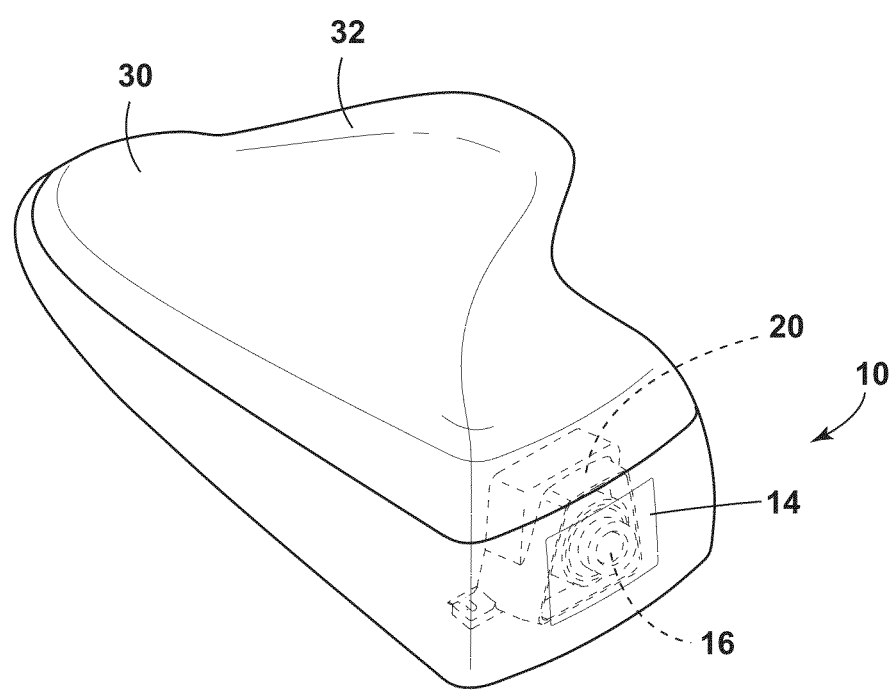
FIG. 3 is a rear top perspective view of the roof-mounted antenna and imager module of FIG. 1 with the imager module hidden from view.
Figure 4:
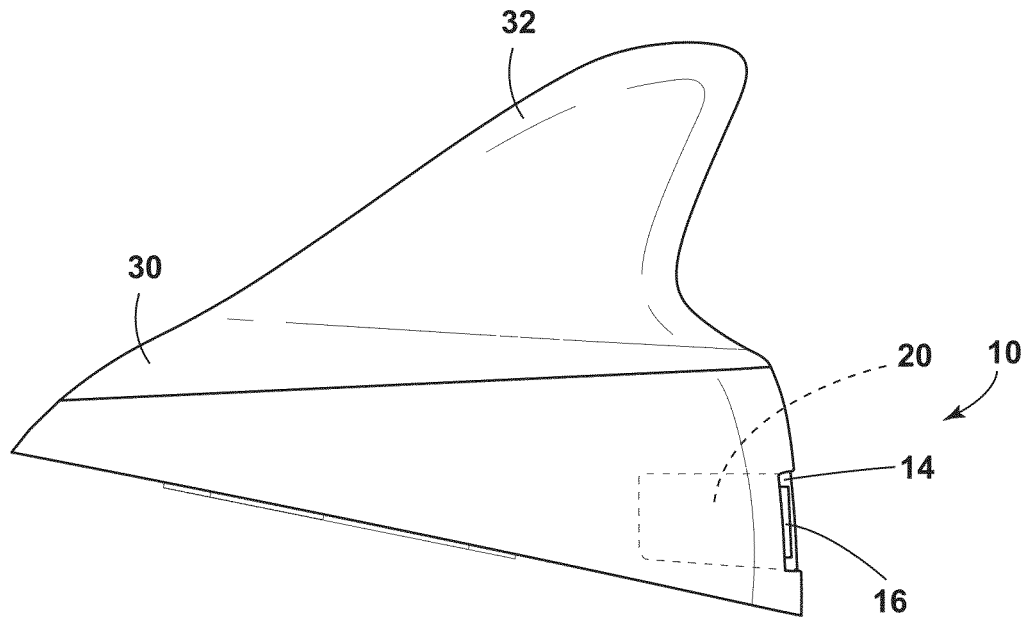
FIG. 4 is a side elevational view of the roof-mounted antenna and imager module of FIG. 1.
Figure 5:
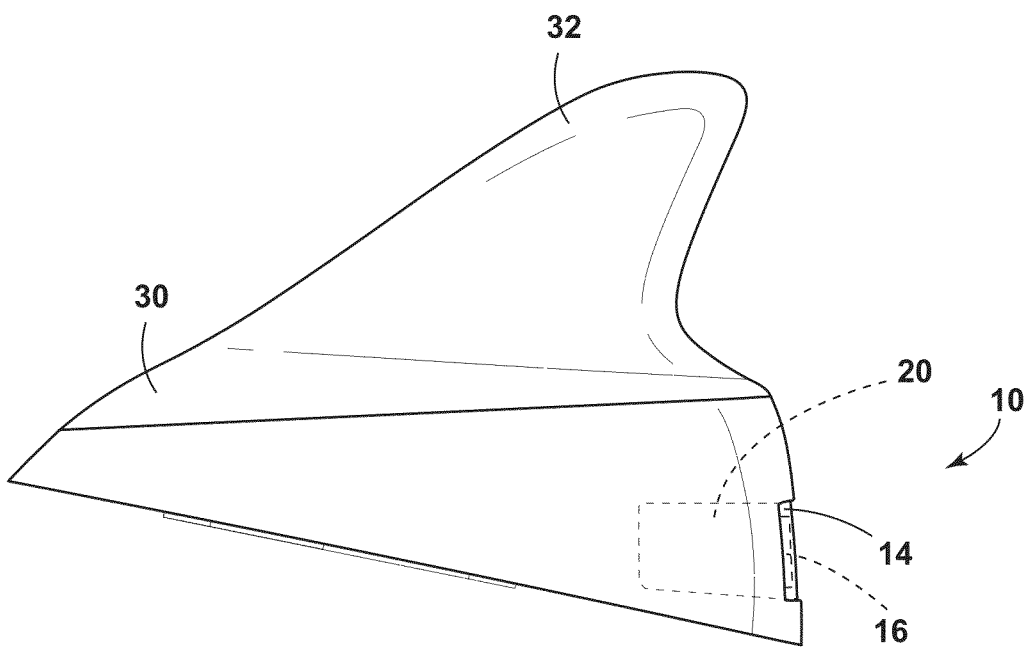
FIG. 5 is a side elevational view of the roof-mounted antenna and imager module of FIG. 4 with the imager module hidden from view.
Figure 6:
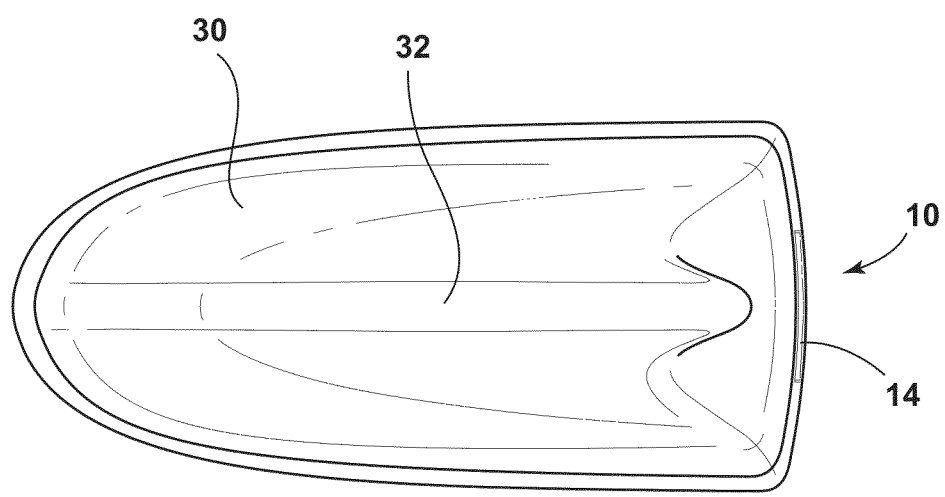
FIG. 6 is a top plan view of the roof-mounted antenna and imager module of FIG. 1.

With reference now to FIGS. 1-6, the cover 14 may include electro-optic functionality which can absorb, reflect, and/or scatter light, thereby obscuring the visibility of the imager 20. The concealing cover 14 may be configured as part of a lens cover, or as part of a body panel. In one example, as shown in FIGS. 1 and 2, the cover 14 includes an electro-optic device that is positioned within a housing 30 of a vehicle antenna 32. In this instance, the cover 14 is disposed proximate the imager lens 16 and conceals the imager lens 16 from view outside of the vehicle 12. It is generally contemplated that the cover 14 may include a light absorbing, reflecting, and/or scattering liquid crystal device or electrochromic material. For example, the cover 14 may incorporate an electro-optic device in the form of an electrochromic device that absorbs light in the visible spectrum. Alternatively, the cover 14 may include a concealing device in the form of a light absorbing device, such as a suspended particle device, when activated (FIG. 3) and does not absorb light (FIG. 4) when deactivated.

In instances where a liquid crystal device is utilized, a liquid crystal cell can be positioned in or on the cover 14 proximate the imager lens 16. Some examples of dimming liquid crystal devices include reflective cholesteric liquid crystal devices, twisted-nematic (TN) liquid crystal devices, and guest-host liquid crystal devices. A reflective cholesteric liquid crystal cell could be used to reflect light and prevent light from reaching the imager 20. In addition to reducing transmission of ambient light, the reflective properties of a reflective cholesteric liquid crystal device will also provide reflection of ambient light. This reflective property will improve the concealment of the imager 20 by increasing the system contrast. The liquid crystal cell can be used in combination with absorbing or reflecting polarizers. If the liquid crystal device includes two absorbing polarizers with a twisted nematic (TN) liquid crystal cell between the polarizers, the liquid crystal device may be used to block light going into or out of the imager 20 in one state, and will allow polarized light to pass through the cover 14 in the opposite state. As an example, the first polarizer may be positioned in the cover 14 proximate a liquid crystal device and would have the same transmission orientation as with the second polarizer positioned behind the liquid crystal cell. In this instance, the system the liquid crystal device would rotate the light 90 degrees and would block light entering the cover 14 when the concealing device of the cover 14 was nonpowered. When the polarizers are positioned such that they will block both polarization orientations when there is no power, the imager 20 will be hidden behind the cover 14 (FIGS. 3 and 5) when the vehicle 12 is off and would not need to be powered to achieve concealment. The polarizers could be absorbing polarizers or reflective polarizers. If one or more reflective polarizers are used, the concealment device of the cover 14 would be somewhat reflective in the off state, and would help to hide the imager 20. In one example, the concealment device of the cover 14 may be a TN liquid crystal cell with at least one reflective polarizer with the concealment device tipped so that when observed, the concealment device appears to reflect a color that is consistent with the vehicle paint or a color of the surrounding surface on the vehicle 12. If the device is on a roof of the vehicle 12, a top of the concealment device of the cover 14 could be tipped down so a typical observer would be likely to perceive the concealment device of the cover 14 to have the same color tone as the color tone of the paint of the vehicle 12 roof (FIG. 1).

In some instances, the concealment device of the cover 14 with reflectance may result in double images or unwanted reflections within the structure. For the liquid crystal device using a TN liquid crystal cell, one configuration would be to put an absorbing polarizer near the imager 20 and a reflective polarizer on the opposite side of the liquid crystal cell. In this instance, the reflection from the reflective polarizer would not interfere with the image data 22 collected by the imager 20 since any light reflected back toward the imager 20 off of the reflective polarizer would be aligned with the absorbing axis of the absorbing polarizer.

In cases where a polarizer is positioned on the exterior portion of the cover 14, it may be advantageous to have an additional substrate laminated to the polarizer to protect it from mechanical abrasion and the environment. In one example, the additional substrate may contain UV-blocking material to protect the polarizer.

In another construction, it may be advantageous to put an electrochromic device or suspended particle device in the cover 14 proximate the imager lens 16 to provide light attenuation. The electrochromic device or suspended particle device may form part of the cover 14. For example, in bright sunlight, the imager 20 may reach a point of light saturation. A dimming device, such as an electrochromic device, could be used to reduce the overall light that reaches the imager 20. It is generally contemplated that the electrochromic device or suspended particle device may be able to be controlled over a wide range of transmission.

There are also a number of light scattering liquid crystal systems that may be used to obstruct the view of the imager 20. One such light scattering device may be based on a polymer dispersed liquid crystal (PDLC). It is also generally contemplated that a light scattering device such as a PDLC device and electrochromic device may be used in conjunction. The electrochromic device could be laminated to the liquid crystal device. Alternatively, the electrochromic device and the liquid crystal device could share a common substrate.

In any of the above examples, the use of an electrochromic device with memory will be particularly advantageous for imager concealment systems designed to conceal the imager 20 when the vehicle is parked. In one example, an electrochromic device may be utilized having a low end transmission of 10 percent and measuring at less than 12 percent after four hours, unpowered at open circuit. The same electrochromic device may have a high-end transmission greater than 50 percent.

Figure 7:
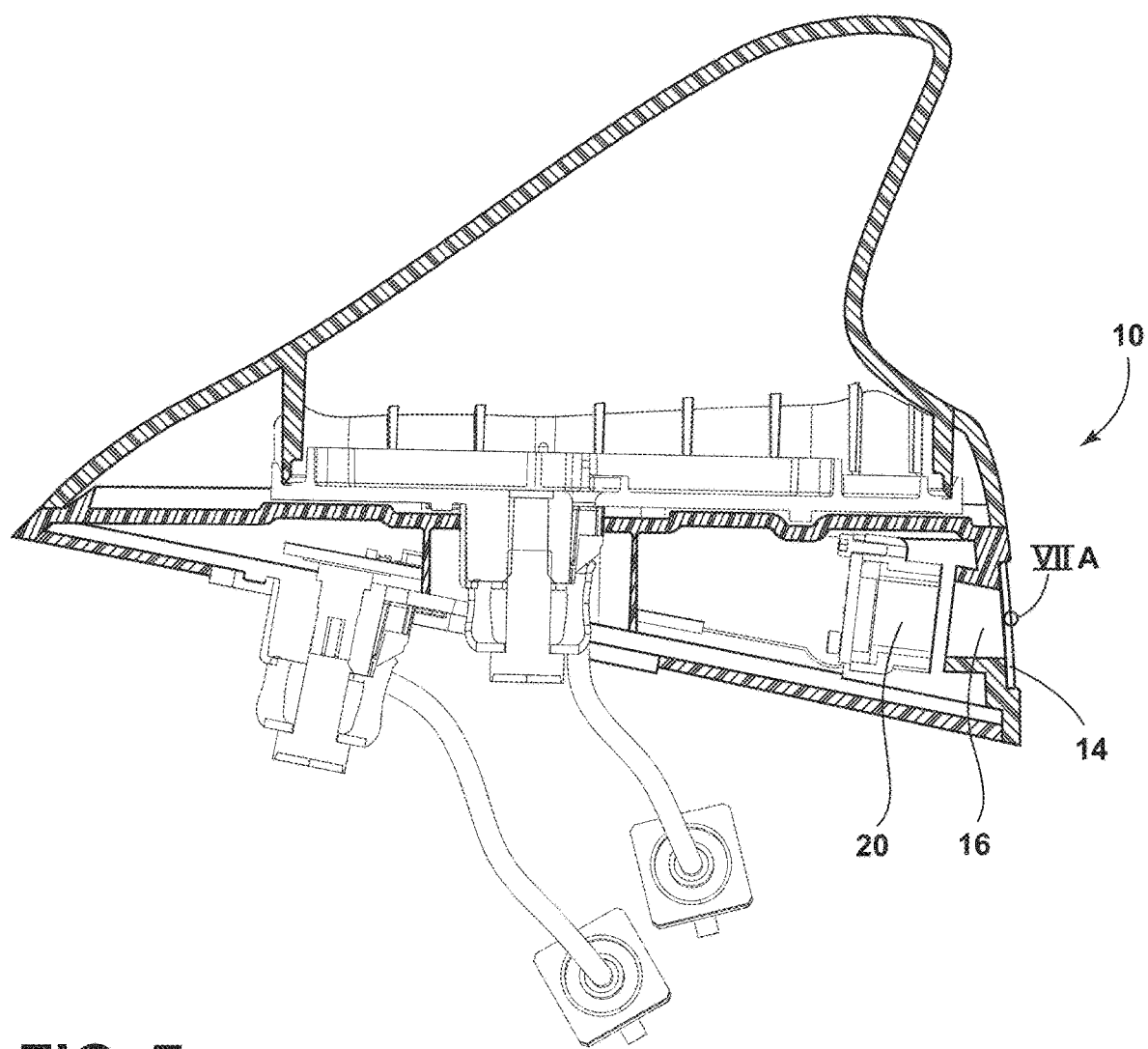
FIG. 7 is a side elevational cross-sectional view of the roof-mounted antenna and imager module of FIG. 1 taken at line VII-VII.
Figure 7A:
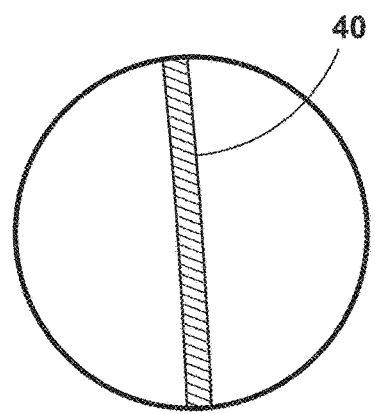
FIG. 7A is a side elevational view of a louvered film, as shown in area VIIA.

Additionally, as illustrated in FIGS. 7 and 7A, a louvered film 40 may also obscure the view of the imager 20 without darkening. The louvered film 40 may be positioned to obstruct the view from the anticipated viewing angle. That angle would vary depending on the position of the imager 20. In one example, the imager 20 may be positioned on top of the vehicle and would have a louver orientation to prevent viewing of the imager 20 from below. An imager positioned low on the vehicle (near a bumper, for example) may have a louver which conceals the imager 20 when viewed from above. Alternatively, a microdot ablation in an otherwise opaque coating proximate the imager lens 16 may allow enough light through for the imager 20 to function while still hiding the imager 20. If the opaque coating is a reflective coating, the imager 20 may be difficult to see during the day when ambient light would reflect off of the reflective surface. At night the imager 20 would remain hidden as the result of the partial light transmission of the coating in both directions.

Figure 8A:
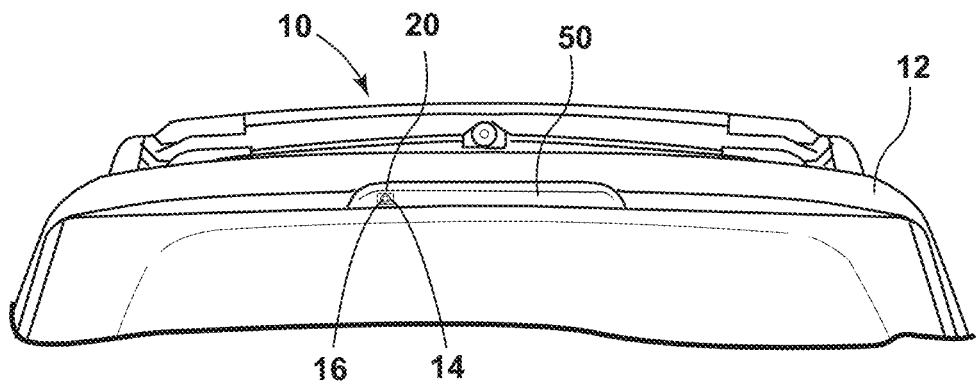
FIG. 8A is a front perspective view of a center high mount stop light of a vehicle having a cover disposed over an imager of the present disclosure.
Figure 8B:
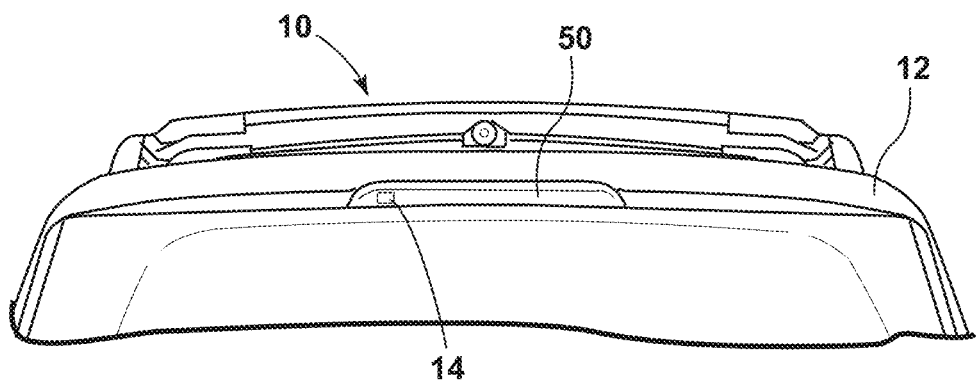
FIG. 8B is another front perspective view of the center high mount stop light of a vehicle having a cover disposed over an imager of the present disclosure.
Figure 8C:
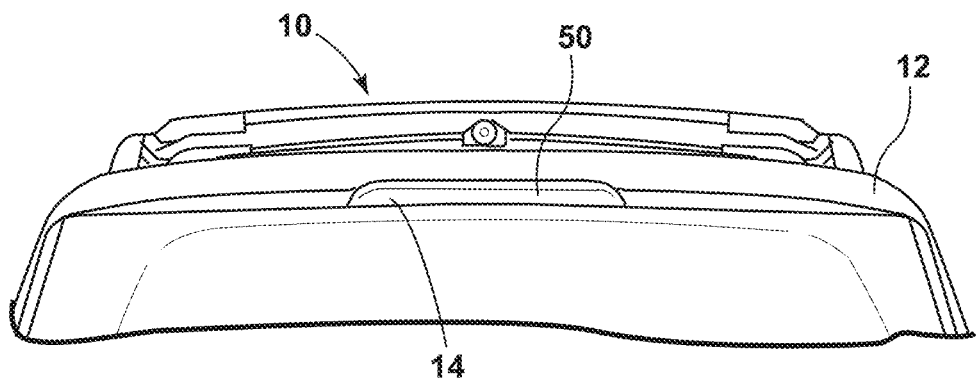
FIG. 8C is another front perspective view of the center high mount stop light of a vehicle having a cover disposed over an imager of the present disclosure.

With reference now to FIGS. 8A-8C, in the illustrated embodiment, a top portion of the vehicle 12 is illustrated having a center high mount stop light (CHMSL) 50. The imager 20 is disposed behind the cover 14 formed as part of the CHMSL 50. The imager 20 is configured to collect the image data 22 from behind the vehicle 12. The cover 14 may be configured to conceal the imager lens 16 by darkening (via any of the manners disclosed above), such that the imager lens 16 is not visible from outside of the vehicle 12. In the darkened state, the cover 14 will appear as a dark square on the body panel or CHMSL 50 of the vehicle 12. Alternatively, as shown in FIG. 8C, using other manners as set forth above, including a reflective polarizer, for instance, the cover 14 can be configured to appear to have a color tone that matches or nearly matches the color tone of the paint of the body panel or CHMSL 50 of the vehicle 12.

Figure 9A:
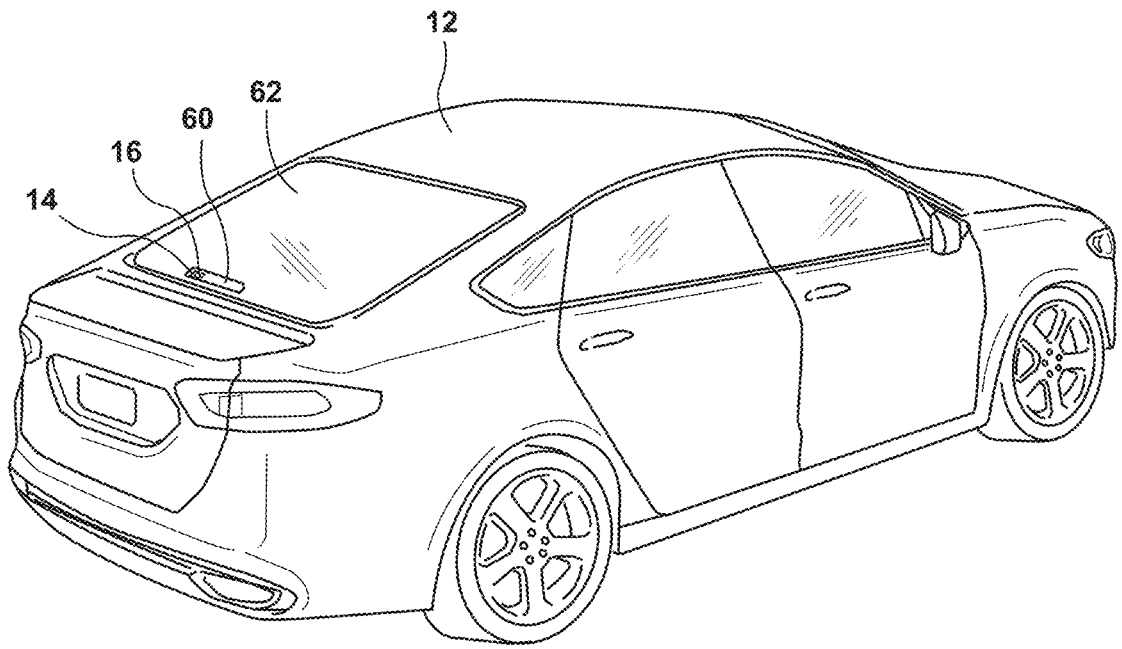
FIG. 9A is a rear elevational view of a vehicle with a brake light including a cover extending over an imager module.
Figure 9B:
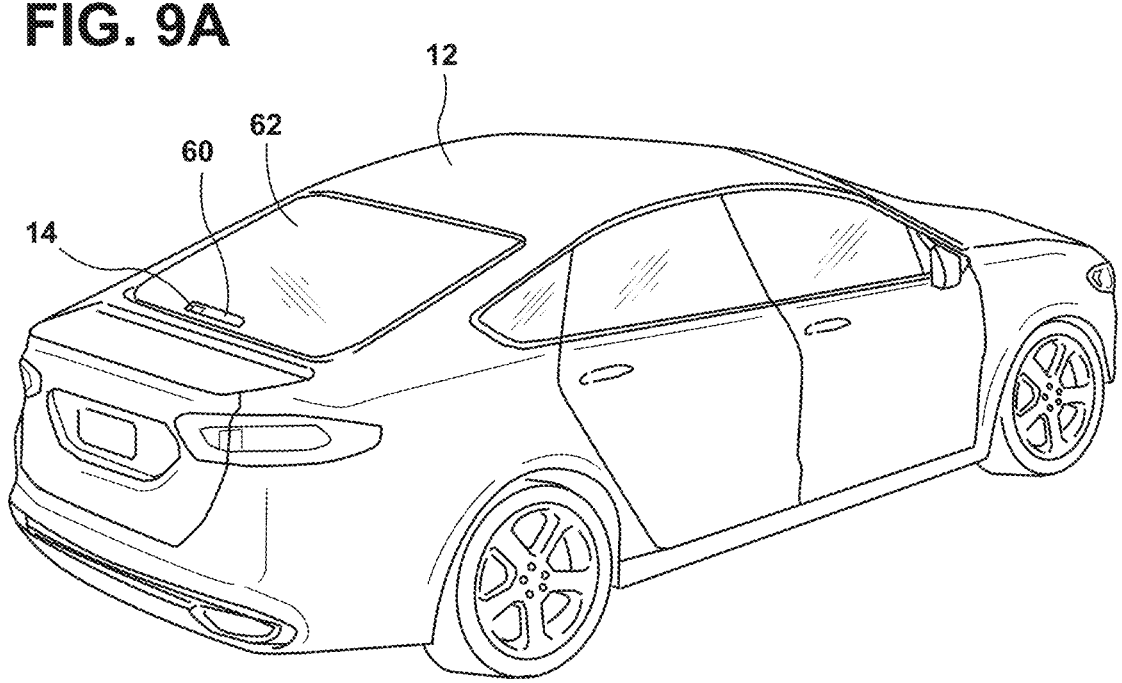
FIG. 9B is a rear elevational view of a vehicle with a brake light including a cover extending over an imager module.
Figure 9C:
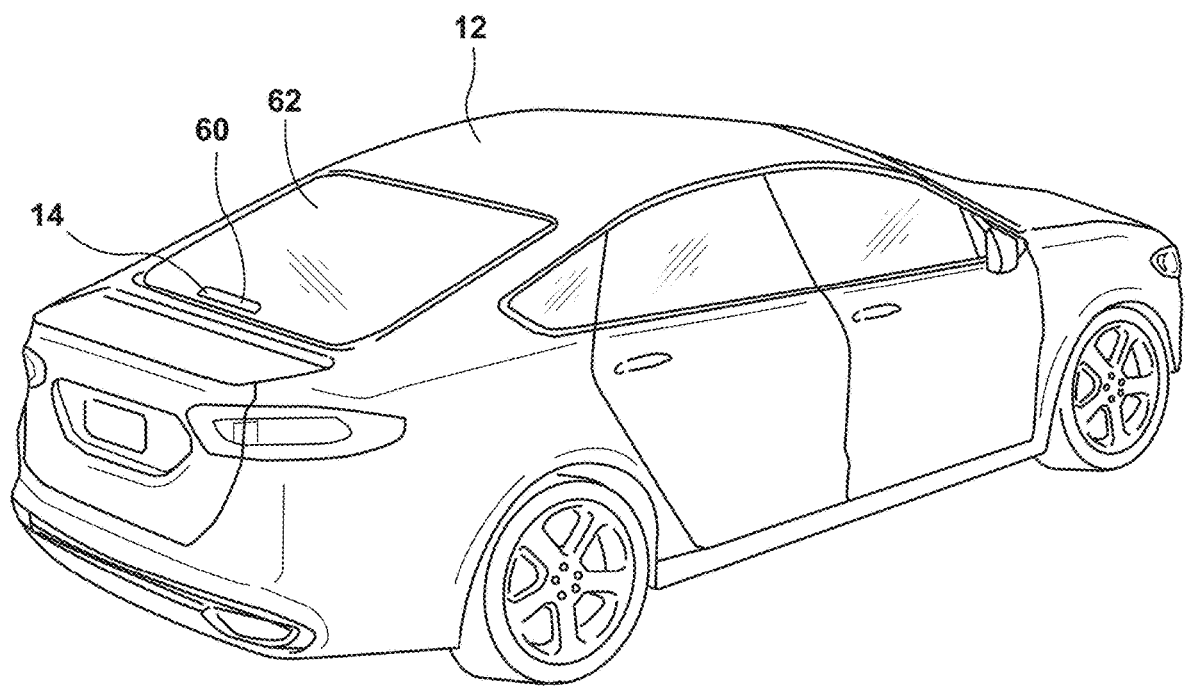
FIG. 9C is another rear elevational view of a vehicle with a brake light including a cover extending over an imager module.

In a similar fashion, as shown in FIGS. 9A-9C, the imager 20 can also be used in or on a brake light 60 of the vehicle 12. In this instance, the imager 20 collects the image data 22 through a rear windshield 62 of the vehicle 12. In an undarkened or deactivated state, the imager 20 may be visible, as shown in FIG. 9A. However, upon activation of the concealment device, which may be any of those set forth above, the imager lens 16 may be hidden from view by the cover 14, which may appear as a darkened area on the brake light 60. Alternatively, as shown in FIG. 9C, the darkened state may be configured to match closely with the hue or general color of the brake light 60, such that the imager 20 is generally not observable, nor is the cover 14 readily discernible relative to its surroundings.

Figure 10:
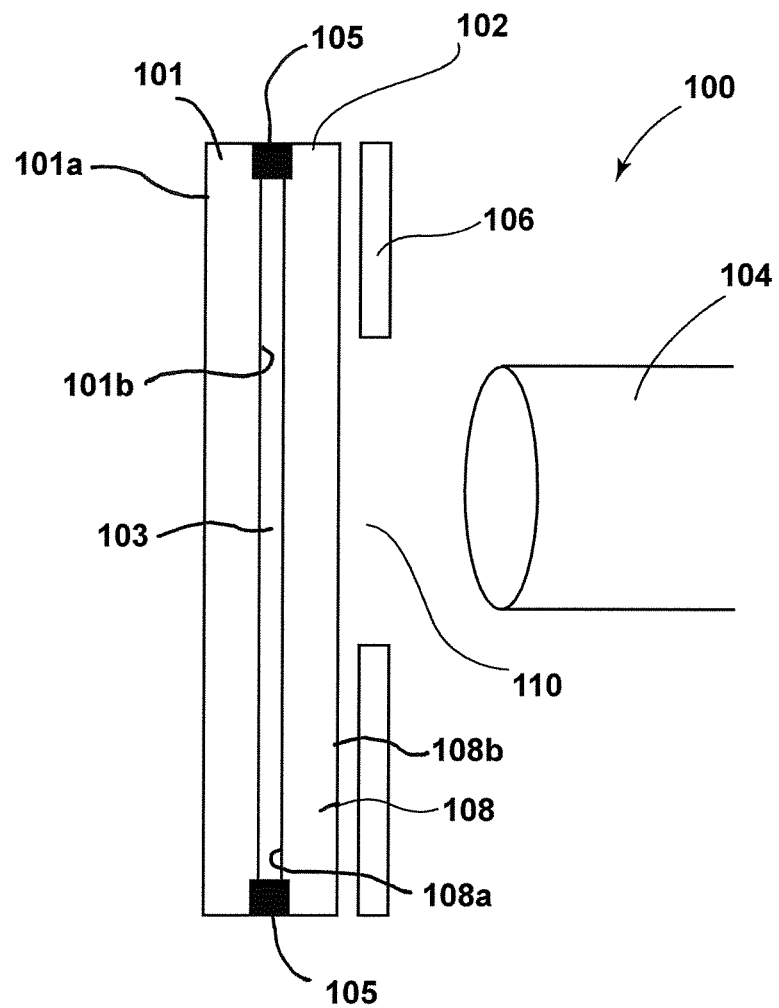
FIG. 10 is a side schematic view of a concealing assembly of the present disclosure in the form of a lens cover.

With reference now to FIG. 10, one example of a concealing assembly 100 in the form of an imager lens cover that includes an electro-optic cell 102 is illustrated. The electro-optic cell 102 may include an electro-optic material 103, such as an electrochromic medium, for concealing an imager 104. The electro-optic cell 102 may include a front substrate 101 defining a first surface 101a and a second surface 101b. The electro-optic cell 102 also includes a rear substrate 108 defining a third surface 108a and a fourth surface 108b. Seals 105 are disposed between the front substrate 101 and the rear substrate 108. The electro-optic material 103 is sealed between the seals 105 and the front and rear substrates 101, 108. The concealing assembly 100 includes a masking layer 106 on the fourth surface 108 of the electro-optic cell 102. The masking layer 106 defines an aperture 110 for the imager 104 and blocks viewing of other portions of the imager 104 or the imager housing when the electro-optic cell 102 is in a clear state. When the electro-optic cell 102 is clear, the imager 104 can view through the aperture 110. When the electro-optic cell 102 is fully darkened, the electro-optic material 103 absorbs and/or reflects at least 75 percent, at least 80 percent, or at least 90 percent of the visible light and substantially reduces the visibility of the masking layer 106 or the imager 104.

In one example, the transmission level of the electro-optic cell 102 can be varied from the clear state of greater than 60 percent visible light transmission to less than one percent transmission in the low transmission state. In the fully low transmission state, the total light reflecting off of the concealing assembly 100 is generally considered color neutral. The C* (chroma) of the concealing assembly 100 is less than 15 in the low transmission state, and may be less than 10 (when measured in the L*C*h color space). If the concealing assembly 100 has C* greater than 15, the hue may have a value of h between about 210 degrees and 280 degrees. In this range of hue, the color will appear generally blue while avoiding more pronounced and typically more objectionable green or red colors. Even when C* is less than 15 or less than 10, it is contemplated that h may be between 210 degrees and 280 degrees. In one embodiment, the visible light transmission in the high transmission state is 63 percent and the low transmission state has 0.5 percent transmission with a C* of 7.6. However, it will be understood that the low end transmission range may extend from 15 percent to less than one percent.

A continuous range of dimming between the clear state and the fully darkened state is possible and may be used to make adjustments to the amount of visible light reaching the imager 104. In some situations, it may be advantageous to dim the electro-optic cell 102 when the ambient conditions are very bright.

For vehicle use, the concealing assembly 100 may be reflecting, absorbing, or scattering visible light to conceal the imager 104 when the vehicle 12 is parked. Concealing assemblies 100 that draw current in the darkened state could, over time, drain the battery of the vehicle 12. There are a number of systems that can maintain low specular transmission with little or no power. Many liquid crystal configurations can maintain a darkened condition when in the off state. Some electrochromic systems can also maintain low transmission with little to no power. A concealing assembly 100 with less than 5 mW of power consumption in the low transmissive state may be acceptable. Power consumption less than 3 mW, 2 mW, or 1 mW may also be utilized.

If an electro-optic element is used as the lens cover to hide an imager, the electro-optic element should clear fast enough to give a driver sufficient visibility behind the car. If an electro-optic element clears too slowly, the driver may not be able to see what they need to see, and this may become a safety concern. This is particularly a problem when the camera is being used at night when there is very little illumination behind the vehicle.

For an electro-optic or electrochromic element that is used for concealing a rearward-facing camera obtaining rearward vision within 5 seconds or less is significant since a driver may enter the vehicle, start the vehicle, and begin backing up within a matter of 2-3 seconds. It is preferred that a dimming lens cover would be sufficiently cleared in 2 seconds. To properly conceal a camera, it is found that a transmission below 15 percent may be sufficient to obtain reasonable concealment and a transmission below 12 percent is more preferred. At a transmission of 15 percent or less, there is minimal light reaching the camera. At night there may not be enough light to back up safely. An electro-optic element that clears to 40 percent or more within 2 seconds will greatly increase visibility before the driver starts to move backward. If the electro-optic device does not clear fast enough, other methods will be needed.

One possible solution to the nighttime visibility issue is to keep the electro-optic element clear when it is dark outside the vehicle. Whenever it is dark, the visibility of the camera is not a concern, so there is no need to conceal the camera. It is important to monitor light levels without causing a significant drain on the vehicle's battery. Less than 1 mW should be used to monitor the light levels. Less than 250 µW is preferred.

In one example, an electro-optic element is used to conceal a rearward-facing camera on a vehicle. An electro-optic element may be used which dims below 15 percent and clears to greater than 40 percent. A controller 120 (FIG. 11) for the electro-optic element 102 is in communication with a light sensor subsystem 125 on the vehicle that monitors ambient light levels. The light sensor subsystem 125 sends a signal to the controller 120 to cause the electro-optic element 102 to clear when ambient light levels are below a specified first threshold level. The light sensor subsystem sends a signal to the controller 120 to cause the electro-optic element 102 to darken when the ambient light levels are above a specified second threshold level. The first and second threshold levels may be the same or may be different to provide a hysteresis so that the electro-optic element is not switched back and forth when the ambient light level is at a particular threshold level. The controller 120 is configured to receive a signal when the vehicle ignition is on (vehicle is running) and to respond to such an ignition signal by clearing the electro-optic element 102 so long as the ignition signal is received whenever the ambient light level is above the second threshold level. If the ambient light level is below the first threshold level, the electro-optic element 102 will already be clear and will remain clear until such time that the ambient light level is above the second threshold level.

Figure 11:
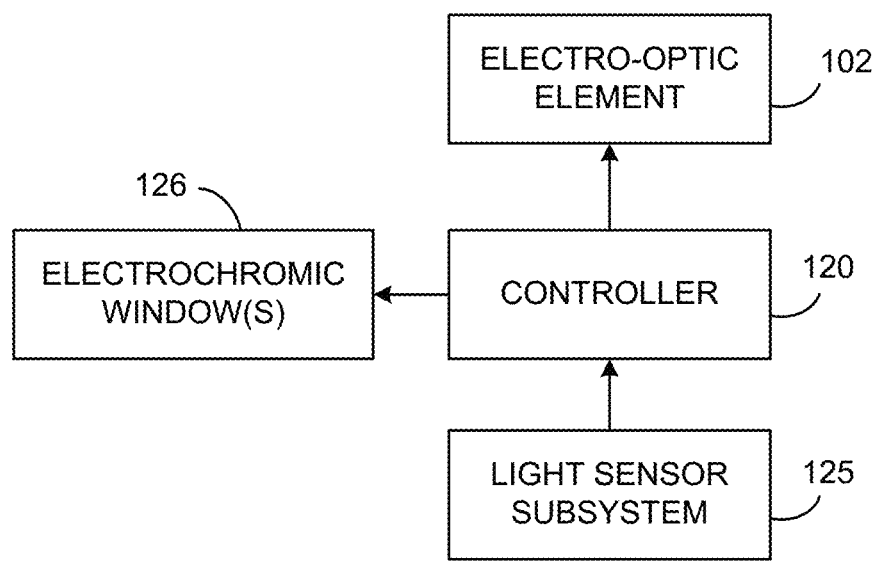
FIG. 11 is an electric circuit diagram in block form of the switchable lens cover of the present disclosure.
Figure 12:
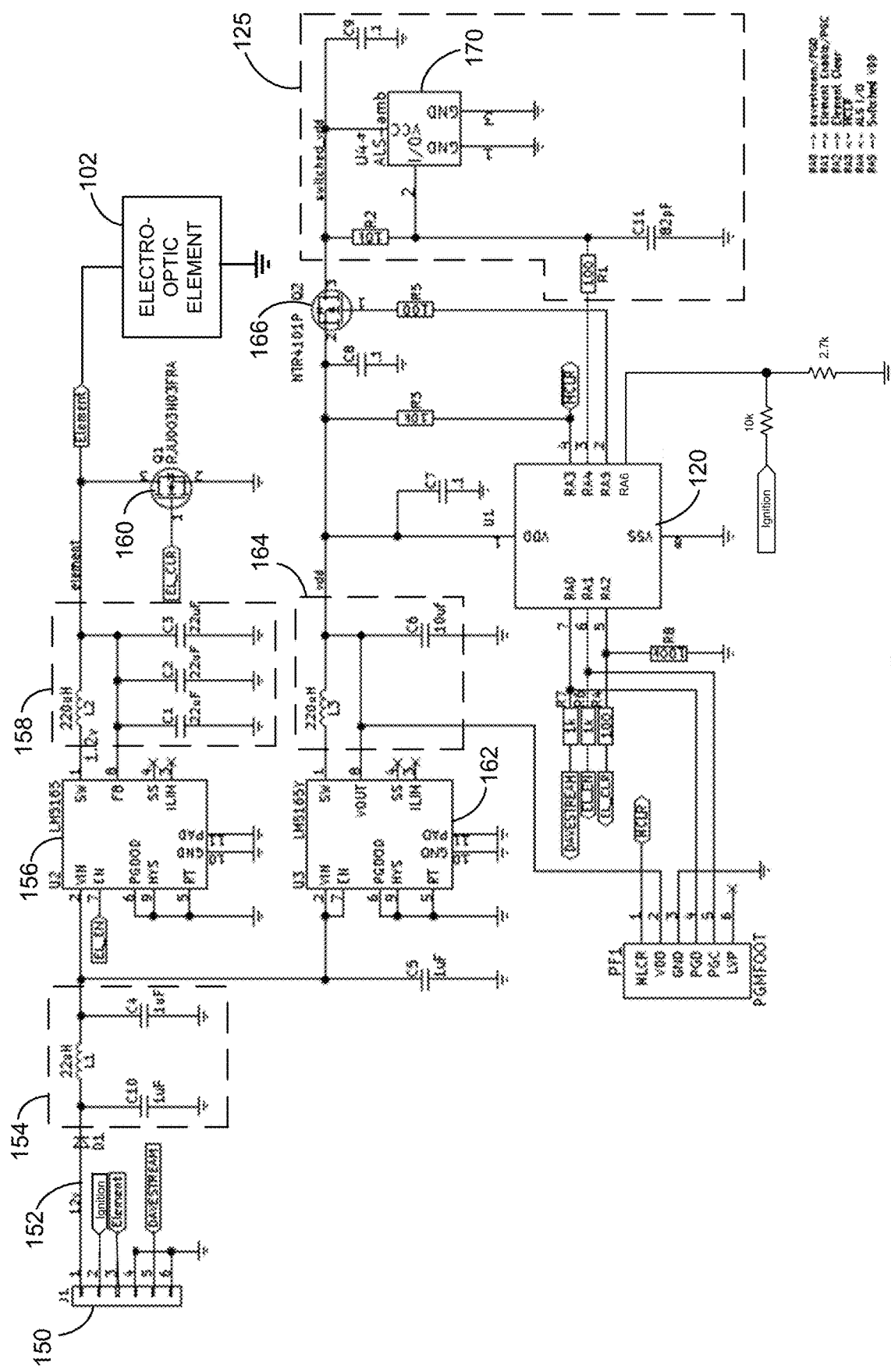
FIG. 12 is an electric circuit diagram in schematic form of an example of the switchable lens cover shown in FIG. 11.

FIG. 12 shows an example of the switchable lens cover circuit shown in FIG. 11. As shown, a connector 150 is connected to the vehicle 12V battery so that it is provided power regardless of whether the vehicle ignition is on or off. The 12V power 152 is passed through a filter 154 to a first buck converter 156, which converts the 12V power 152 to 1.2V. The 1.2V output then passes through a conditioning circuit 158 before being supplied to the electro-optic element 102, which in this particular example, may be an electrochromic element. The 1.2V output may be selectively supplied to the electro-optic element 102 by enabling/disabling the first buck converter 156. The controller 120 may be coupled to the first buck converter 156 via the output EL_EN on output pin RA1 to selectively enable or disable the first buck converter from supplying the 1.2 V power to the electro-optic element 102. The control routine 130 for this function is described below with reference to FIG. 13.

The controller 120 may also force the electro-optic element 102 to clear by sending a signal via output EL_CLR from output pin RA2 to a switch 160 that creates a short to ground across electro-optic element 102. This speeds the clearing of the electro-optic element 102.

A second buck converter 162 is provided to convert the 12V power 152 to a voltage vdd suitable for powering the controller 120 and the light sensor subsystem 125. The first and second buck converters 156 and 162 have a low standby current and provide the advantage of efficiently converting the voltages while minimizing power consumption. This is advantageous since this circuit operates off the vehicle battery while minimizing current draw on the battery. Further, the buck converters do not require much protection up front, which further reduces power consumption and cost.

The light sensor subsystem 125 may include a light sensor 170, a conditioning circuit 164, and a switch 166. The input/output of the light sensor 170 is coupled to the controller 120 so that the controller 120 may receive the output from the light sensor 170. In addition, the controller 120 may optionally control the sensitivity of the light sensor 170. The switch 166 is provided to selectively provide power to the light sensor 170 under control of the controller 120. This way the controller 120 can periodically supply power to the light sensor 170 so as to limit the power drain by the light sensor 170. The controller 120 may average the light sensor readings. For example, a moving average of the light sensor readings may be used whereby 1/16 of the value of the previous average is subtracted from the previous average and 1/16 of the new reading is added to arrive at the new average. The pin marked DAVESTREAM is a bidirectional I/O line which can be used for diagnostics or to provide input from the vehicle to override or modify the response to the light sensor.

Figure 13:
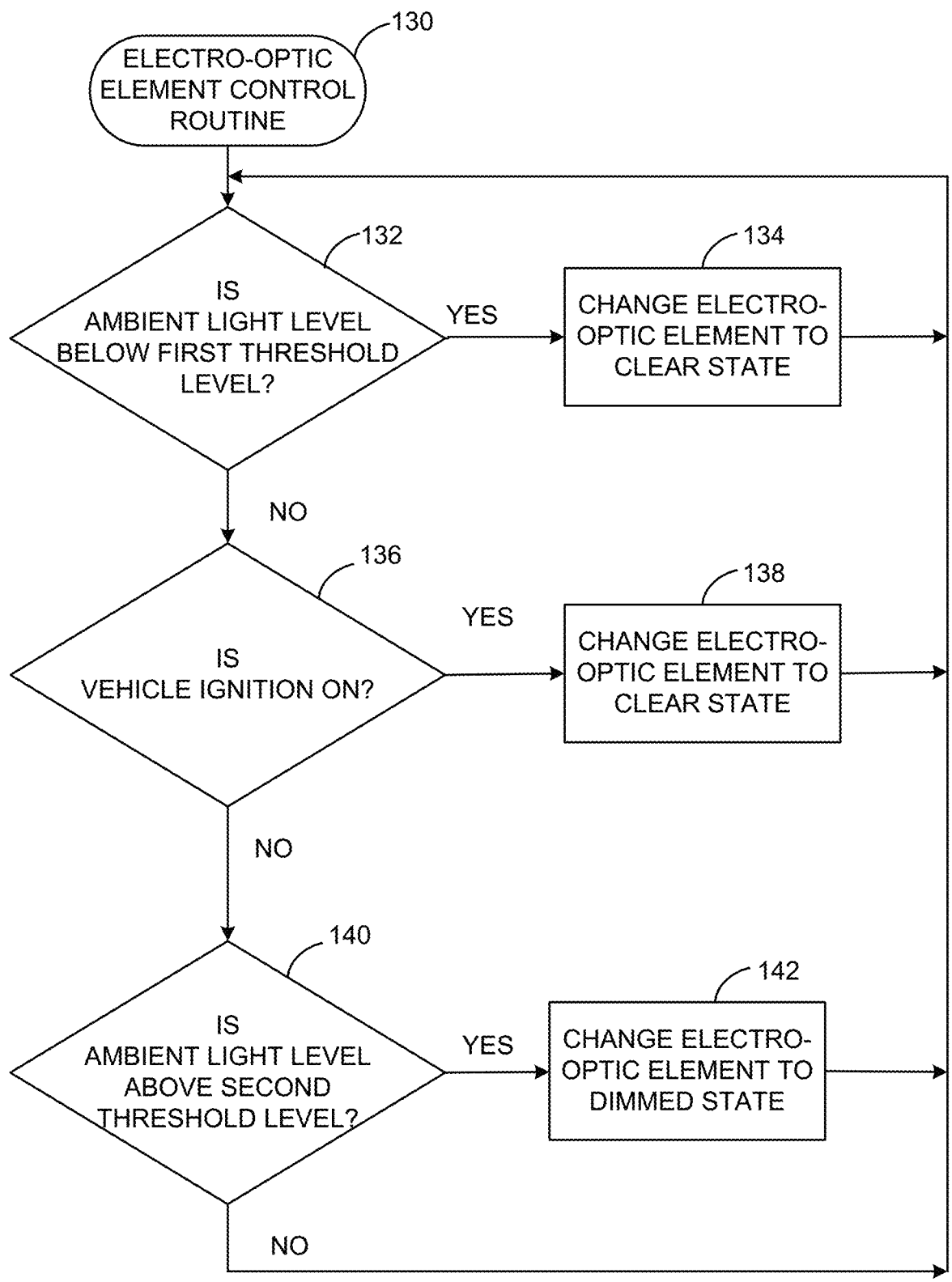
FIG. 13 is a flowchart illustrating an electro-optic control routine performed by a controller of the imager module as shown in FIG. 11.

An electro-optic element control routine 130 is shown in FIG. 13. The routine 130 begins with the controller 120 determining if the ambient light level is below the first threshold level (indicating nighttime light conditions) in step 132. If the ambient light level is below the first threshold level, the controller 120 changes (or maintains) the electro-optic element 102 in the clear state in step 134 before returning to step 132. If the ambient light level is not below the first threshold level, the controller 120 determines in step 136 if the vehicle ignition is on.

If the vehicle ignition is on (the vehicle is running), the controller 120 changes (or maintains) the electro-optic element 102 in the clear state in step 138 before returning to step 132. If the vehicle ignition is not on, the controller 120 determines in step 140 whether the ambient light level is above the second threshold level (indicating daytime light conditions). If the ambient light level is not above the second threshold level, the controller 120 returns to step 132. If the ambient light level is above the second threshold level, the controller 120 changes (or maintains) the electro-optic element 102 in the dimmed state in step 142 before returning to step 132.

The circuit described above with respect to FIGS. 11-13 may also be used to control electrochromic windows 126 of the vehicle 12. Specifically, some windows of the vehicle (the front windshield and the front side windows) typically cannot be tinted as dark as the rest of the windows. However, when the vehicle is parked in bright sunlight, it may be desirable to dim/darken all windows so as to block out the heat from the sun, while at least partially clearing at least the front windshield and the front side windows when the vehicle ignition is on to ensure the vehicle meets the legal requirements for transmission. The controller 120 may thus further control the transmissive state of electrochromic windows 126 of the vehicle 12, wherein the controller 120 controls the electrochromic windows 126 to be in a dimmed state when the vehicle ignition is off and the ambient light level is above the second threshold level and controls the electrochromic windows 126 to be in at least a partially clear state when the ambient light level is below a first threshold level or when the vehicle ignition is on.

In the above control routine, the controller 120 clears the electro-optic element 102 when the vehicle ignition is on so that the electro-optic element 102 is clear whenever the imager 104 is capturing images. However, it may be desired to have the electro-optic element 102 dimmed when the vehicle ignition is on. For example, in very bright conditions, the electro-optic element 102 may be dimmed to increase the dynamic range of the imager 104. Depending upon the electro-optic element 102 that is used, color shifts may be introduced by the electro-optic element 102 when in the dimmed state. For many electrochromic elements, these color shifts will be towards the blue and/or green region of the visible spectrum. These color shifts may be compensated using auto white balance adjustments. Another approach is to measure the open circuit voltage of the electro-optic element 102 to determine the extent of dimming and hence the color shift created by the electro-optic element. The color shift may then be corrected through image processing of the image data. Yet another solution would be to construct the electro-optic element 102 as an electrochromic element having a color neutral electrochromic medium as disclosed in U.S. Pat. No. 6,020,987, the entire disclosure of which is incorporated herein by reference. By using such a color neutral electrochromic medium, the element will transition from the clear to the fully dimmed state and back without imposing any color shift.

An infrared (IR) absorbing electrochromic medium may be used in the electro-optic element 102 so that the lens cover functions as an IR cut filter when dimmed. In this case, the electro-optic element 102 may be dimmed during daytime conditions even when the vehicle is moving so that the electro-optic element 102 blocks IR radiation from reaching the imager 104, which may affect the color sensed by the imager. However, at nighttime, the electro-optic element may be cleared so that it no longer blocks IR radiation and allows the imager 104 to receive the IR radiation, which enhances the sensitivity of the imager 104 thus providing greater night vision. An example of an electrochromic medium having such IR absorbing capabilities is disclosed in U.S. Pat. No. 6,193,912, the entire disclosure of which is incorporated herein by reference.

Although the switchable lens cover is described as an electro-optic element controlled as a function of the output of a light sensor, a photochromic element may be used in place of the electro-optic element. Photochromic elements can change from a low light transmission state to a high light transmission state when exposed to light. The use of a photochromic element would provide the advantage of not having an electrical control circuit and hence not drawing power from the vehicle battery.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An imager module for a vehicle comprising:
   an imager including an imager lens, the imager being configured to collect image data from at least one of inside and outside the vehicle;
   a cover disposed proximate the imager lens, the cover configured to allow the imager to capture image data through the cover, wherein the cover includes an electro-optic element that is operable between:
     a first condition in which the imager is generally visible through the cover; and
     a second condition in which the imager is generally concealed from view by the cover;
   a light sensor subsystem for sensing an ambient light level; and
   a controller configured to receive an output from the light sensor subsystem representing the ambient light level and to control the electro-optic element by selecting a clear state when the ambient light level is below a first threshold level and by selecting a dimmed state when the ambient light level is above a second threshold level.

2. The imager module of claim 1, wherein the electro-optic element is an electrochromic element.

3. The imager module of claim 1, wherein the electro-optic element has a light transmission of less than about 15 percent when in the dimmed state.

4. The imager module of claim 1, wherein the electro-optic element has a light transmission of less than about 12 percent when in the dimmed state.

5. The imager module of claim 1, wherein the controller is further configured to control the electro-optic element by selecting a clear state when the vehicle ignition is on.

6. The imager module of claim 1, wherein the electro-optic device consumes 5 mW or less of power in the dimmed state.

7. The imager module of claim 1, wherein the electro-optic device changes from the dimmed state of 15 percent transmittance or less to the cleared state of 40 percent transmittance or more in 2 seconds or less.

8. The imager module of claim 1, wherein the electro-optic element comprises at least one of a liquid crystal device, suspended particle device, variable light attenuation device, and light scattering device.

9. The imager module of claim 1, wherein the controller further controls the transmissive state of electrochromic windows of the vehicle, wherein the controller controls the electrochromic windows to be in a dimmed state when the vehicle ignition is off and the ambient light level is above the second threshold level and controls the electrochromic windows to be in a clear state when the ambient light level is below a first threshold level.

10. An imager lens cover for a vehicle having an imager having an imager lens, the imager lens cover comprises a cover disposed proximate the imager lens, wherein the cover is configured to allow the imager to capture image data through the cover, the cover includes an electro-optic device operable between a first condition in which the imager is generally visible through the cover, and a second condition in which the imager is generally concealed from view by the cover, wherein the electro-optic device consumes 5 mW or less of power in the dimmed state.

11. The imager lens cover of claim 10, wherein the electro-optic element comprises at least one of a liquid crystal device, suspended particle device, variable light attenuation device, and light scattering device.

12. The imager lens cover of claim 10, wherein the electro-optic element is an electrochromic element.

13. The imager lens cover of claim 10, wherein the electro-optic element has a light transmission of less than about 15 percent when in the dimmed state.

14. An imager lens cover for a vehicle having an imager having an imager lens, the imager lens cover comprises a cover disposed proximate the imager lens, wherein the cover is configured to allow the imager to capture image data through the cover, the cover includes an electro-optic device operable between a first condition in which the imager is generally visible through the cover, and a second condition in which the imager is generally concealed from view by the cover, wherein the electro-optic device changes from the dimmed state of 15 percent transmittance or less to the cleared state of 40 percent transmittance or more in 2 seconds or less.

15. An imager lens cover for a vehicle having an imager having an imager lens, the imager lens cover comprises a cover disposed proximate the imager lens, wherein the cover is configured to allow the imager to capture image data through the cover, the cover includes an electro-optic device operable between a first condition in which the imager is generally visible through the cover, and a second condition in which the imager is generally concealed from view by the cover, wherein the electro-optic device is a liquid crystal device and the cover further comprises a first polarizer positioned in front of the liquid crystal device and a second polarizer positioned behind the liquid crystal device, the first and second polarizers having opposite polarization orientations so as to block both polarization orientations when there is no power supplied to the liquid crystal device, wherein the liquid crystal device alters the polarization of the light received through the first polarizer such that it passes through the second polarizer to the imager when the liquid crystal device receives power.

16. An imager lens cover for a vehicle having an imager having an imager lens, the imager lens cover comprises a cover disposed proximate the imager lens, wherein the cover is configured to allow the imager to capture image data through the cover, the cover is operable between a first condition in which the imager is generally visible through the cover, and a second condition in which the imager is generally concealed from view by the cover, wherein the cover consumes 5 mW or less of power in the dimmed state.

17. The imager lens cover of claim 16, wherein the cover includes a photochromic device.

18. The imager lens cover of claim 16, wherein the cover includes an electro-optic device.

\* \* \* \* \*